3,079,258
LIGHT SENSITIVE COMPOSITIONS OF TRIPHENYLMETHANE DYES AND CYANURIC ACID COMPOUNDS

Meyer S. Agruss, Chicago, Ill., assignor to Miehle-Goss-Dexter, Incorporated, Chicago, Ill., a corporation of Delaware
No Drawing. Filed June 13, 1960, Ser. No. 35,446
11 Claims. (Cl. 96—90)

This invention relates to the art of printing and is particularly concerned with the preparation of new and useful photosensitive compositions which may be coated on paper or other suitable surfaces, in the form of essentially colorless or relatively lightly colored bodies, and which are rendered colored or deeply colored, by exposure, through a desired transparency or the like, to electromagnetic radiation lower than 4000 angstrom units, particularly ultraviolet light or other such activating rays, for instance, X-rays.

It has long been known that solutions of aminotriarylacetonitriles or, in other words, leucocyanides of triphenylmethane dyes, generally in the form of solutions thereof, may be coated on paper or other materials in conjunction with an activator and exposed to ultraviolet light or shorter wave lengths, through a transparency, whereupon said aminotriarylacetonitriles are converted into colored bodies or dyes. Suitable activators known for such purpose are, for instance, alcohols, phenols, carboxylic acids such as tartaric acid, citric acid and benzoic acid, as well as other carboxylic acids and esters thereof, certain nitriles, certain aromatic amines, veratrole, resorcinol dimethyl ether, ethylene glycol ethers, phosphoric acid esters of monohydroxy compounds, aromatic carbinols, and numbers of other compounds. These approaches, and others, are disclosed in various patents among which may be mentioned U.S. Patents Nos. 2,441,561; 2,528,496; 2,676,887; 2,829,052; and 2,844,465. Thus, as disclosed in said patents, if an organic solvent solution, for example, a toluene solution, of a leucocyanide of a triphenylmethane dye, for instance, pararosaniline leucocyanide, malachite green leucocyanide, tetrachloro malachite green leucocyanide, crystal violet leucocyanide, and various other leucocyanides of triphenylmethane dyes such as are shown in the aforementioned patents, is coated onto paper, such solution is not affected by ultraviolet light. However, when an activator, for example, a higher molecular weight alcohol or higher molecular weight amine, or other activators, such as the activators disclosed in the aforementioned patents, is present, the leucocyanides of the triphenylmethane dyes become extremely sensitive to ultraviolet light and the leucocyanide compounds are changed quite quickly to their colored dye compounds.

In practical use, the compositions of the prior art, such as those which have been discussed above, have numbers of serious objections. For instance, when paper is coated with a solution of a leucocyanide of a triphenylmethane dye together with activators of the type described above, and said coated papers are exposed to ultraviolet light through a transparency, the colored dye images which result tend to fade out and become substantially colorless in a relatively short period of time, sometimes of the order of 24 hours, and this not infrequently occurs in the dark as well as under ambient light conditions. By "ambient" light conditions is meant normal indoor lighting or daylight. Attempts have been made to meet this problem, generally, for example, by the addition of acids, particularly non-volatile organic acids such as stearic acid, and, in certain special instances, by the selection of specific types of leucocyanides. Although the addition of such carboxylic acids as stearic acid tends to prevent the disappearance of the image while stored in the dark, under ambient light storage conditions the background of the image continues to get darker with the passage of time.

Other difficulties have also been encountered in connection with attempting to evolve commercially practicable compositions. Such difficulties have centered around such matters as inadequate maintenance of the sharpness of reproductions, adverse effects resulting from reactions of the leucocyanide or the dye with sizes inherently present in the papers which are coated with the leucocyanide compositions, and the fact that the activation of the dye in the presence of ultraviolet or other actinic light requires a much longer period of time through an ordinary film negative than when no transparency is used. In my copending application Serial No. 4,875, filed January 27, 1960, effective solutions to such problems are disclosed.

It has heretofore been known in the art that, in the presence of cyanides such as sodium cyanide and potassium cyanide, the leucocyanides of triphenylmethane dyes are extremely sensitive to ultraviolet light or other electromagnetic radiation lower than 4000 angstrom units. Unfortunately, however, such cyanides produce very rapid dark reactions so that, from a practical standpoint, they are of no commercial value.

It has been discovered, in accordance with the present invention, that cyanuric acid compounds, including cyanuric acid and cyanuric chloride, but especially cyanuric acid esters, in the presence of the leucocyanides of triphenylmethane dyes, bring about rapid color formation, under the action of ultraviolet light or other electromagnetic radiation lower than 4000 angstrom units, in a manner similar to the functioning of sodium cyanide and potassium cyanide. However, contrary to the undesired production of very rapid dark reactions, such as occurs with said latter cyanides, the cyanuric acid compounds, and particularly the esters of cyanuric acid, exhibit little, if any, tendency to produce dark reactions.

The cyanuric acid compounds which are useful in the practice of the invention may be represented by the formula

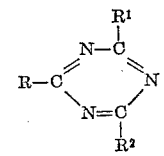

wherein R, $R^1$ and $R^2$ are hydroxy, or chlorine, or OX where X is a hydrocarbon radical, to wit, alkyl, alkenyl, cycloalkyl, aryl, aralkyl or alkaryl, X containing up to 18 carbon atoms but particularly from 2 to 6 carbon atoms. Of particular utility are those compounds in which R, $R^1$ and $R^2$ are the same in any given compound, whether they be hydroxy, chlorine or OX. The said formula encompasses cyanuric acid, cyanuric chloride, and triesters of cyanuric acid.

Illustrative examples of such esters are trimethylcyanurate, triethylcyanurate, triallycyanurate, trivinylcyanurate, triisopropylcyanurate, tributylcyanurate, tricyclohexylcyanurate, triphenylcyanurate, tritolylcyanurate, tribenzylcyanurate, and triethylbenzylcyanurate. Of especial utility is triallylcyanurate and its use represents a particularly important, though limited, embodiment of the invention.

As stated, in coated papers, prepared from light sensitive compositions comprising leucocyanides of triphenylmethane dyes and the aforesaid cyanuric acid compounds as activators, exposed to ultraviolet or similar light through a transparency, the darkening of backgrounds under ambient conditions is very substantially reduced and dark reactions in the coated papers are essentially eliminated.

The leucocyanides of the triphenylmethane dyes which are utilized in accordance with the present invention can be selected, for instance, from those which are known to the art and disclosed in numerous patents and publications of which the foregoing patents are typical. These include, in addition to those previously mentioned, and those disclosed in said foregoing patents, leucocyanide of rosaniline; leucocyanide of new fuchsine; 4,4'-bis-dimethyl-amino-2"-chloro-triphenylacetonitrile and like leucocyanide compounds represented by the formula

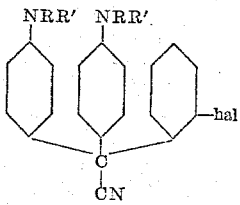

where R and R' are lower alkyl radicals and hal is halogen such as chlorine or bromine.

Various organic solvents can be utilized for the leucocyanides of the triphenylmethane dyes. Low boiling or volatile alcohols, ketones, ethers, esters, and hydrocarbons are available. Typical examples of organic solvents are methyl alcohol, ethyl alcohol, isopropyl alcohol, acetone, dioxane, methylethyl ketone, ethyl ether, isopropyl ether, ethyl acetate, nitromethane, nitroethane, benzene, toluene, dimethylformamide and tetrahydrofurane.

The proportions of the ingredients are variable within reasonable limits.

The leucocyanides of the triphenylmethane dyes will generally be utilized in proportions of the order of 0.5% to 3%, preferably from about 1% to 1.5%, by weight of the solution in which they are incorporated and which is utilized for effecting coating of the paper or equivalent surface.

The cyanuric acid compounds will generally be utilized in proportions of the order of 2 to 25%, preferably about 5 to 12%, by weight of the solution in which the same are incorporated.

The following examples are illustrative of compositions falling within the scope of the invention. They are, of course, not to be construed as in any way limitative of the invention since numerous changes may be made, with respect to selection of leucocyanides, activators, coatings, ranges of proportions, and the like, without departing from the novel principles and teachings presented herein. All parts listed are by weight percent.

*Example 1*

Leucocyanide of crystal violet _____ 1
Triallylcyanurate _____ 15
20% solution of cellulose acetate butyrate in 50–50 mixture of toluene and ethyl acetate _____ 25
Dioxane _____ 59

*Example 2*

Leucocyanide of pararosaniline _____ 1
Triallylcyanurate _____ 20
20% solution of cellulose acetate butyrate in 50–50 mixture of toluene and ethyl acetate _____ 25
Dioxane _____ 54

*Example 3*

Leucocyanide of malachite green _____ 1
Triallylcyanurate _____ 18
20% solution of cellulose acetate butyrate in 50–50 mixture of toluene and ethyl acetate _____ 25
Dioxane _____ 56

Each of the foregoing compositions is coated onto paper on which advantageously a thin barrier coating comprising a toluene-ethyl acetate solution of cellulose acetate butyrate is first deposited and then dried. After the coatings are dried, they are exposed to a source of ultraviolet light through a cellulose acetate butyrate, cellulose acetate or other transparency. The resulting colored papers show good reproductions which are stable over long periods of time to conditions of darkness as well as ambient light.

Transparent cellulose acetate butyrates represent especially desirable organic film-forming barrier coatings, or coatings in solution in which the leucocyanides and the cyanuric acid compounds are dispersed or dissolved, or top coatings. Other transparent organic film-forming materials can be utilized such as polyvinyl alcohols, cellulose acetates, and the like.

Instead of utilizing a single coating of a given thickness containing the leucocyanides of triphenylmethane dyes, it is usually more desirable to employ a plurality of coatings, either two or more, each of thinner character so as to provide a total thickness corresponding to what would otherwise be in the form of a single coating.

The leucocyanides of the triphenylmethane dyes, in the presence of the cyanuric acid compounds, are, as stated above, sensitive when subjected to ultraviolet light and various of them are also sensitive to other electromagnetic radiation shorter than 4000 angstrom units. Moreover, within the ultraviolet range or the aforesaid range of electromagnetic radiation, the various leucocyanides vary in the sensitivity with different wave lengths. In general, the range of wave lengths in which sensitivity mainly occurs is approximately 2000 to 4000 angstrom units, with strongest sensitivity usually lying in the range of 2500 to 3400 angstrom units. Various suitable sources of the aforesaid rays or radiation are available in the art including, by way of example, quartz mercury lamps, ultraviolet cored carbon arcs, and high-flash lamps.

Transparencies of various types can be employed as, for instance, those of cellulose acetate and cellulose acetate butyrate, advantageously of a thickness not appreciably exceeding 0.0025 inch. When ultraviolet rays are passed through an ordinary film negative, the time required to cause formation of the dye from its leucocyanide is much longer than when no transparency is used. Hence, in order to obtain rapid activation of the leucocyanide, the use of transparencies of the character indicated above is especially advantageous.

While, at least for most purposes, papers will constitute the surfaces on which the photosensitive coatings are deposited, it will be understood that, in the broader aspects of the invention, various other materials can be used such as metals, glass, textile fabrics, and sheet stock or films of synthetic plastics such as cellulose acetate, cellophane, cellulose acetate butyrate, etc.

The photosensitive compositions of the present invention may have incorporated therein various supplemental agents such as have heretofore been utilized in known photosensitive compositions so long as they do not adversely affect the desired properties and characteristics of said compositions.

The invention is of value in the arts of color and multicolor printing, photography and photoduplication, microfilm enlargement, and actinometry.

What is claimed and desired to be secured by Letters Patent is:

1. A photosensitive composition, sensitive to ultraviolet light, comprising a leucocyanide of a triphenylmethane dye and, as an activator therefor, a cyanuric acid compound represented by the formula

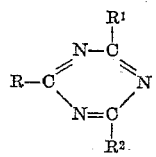

where R, $R^1$ and $R^2$ are selected from the group consisting of hydroxy, chlorine, and OX in which X is a hydrocarbon radical from the group consisting of alkyl, alkenyl, cycloalkyl, aryl, aralkyl, and alkaryl, X containing up to 18 carbon atoms.

2. A photosensitive composition, sensitive to ultraviolet light, comprising a leucocyanide of a triphenylmethane dye, and, as an activator for said leucocyanide, a cyanuric acid compound represented by the formula

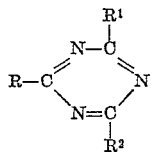

where R, R¹ and R² are the same and are selected from the group consisting of hydroxy, chlorine, and OX in which X is a hydrocarbon radical from the group consisting of alkyl, alkenyl, cycloalkyl, aryl, aralkyl, and alkaryl, X containing up to 18 carbon atoms.

3. A photosensitive composition, sensitive to ultraviolet light, comprising a leucocyanide of a triphenylmethane dye and, as an activator therefor, a triester of cyanuric acid.

4. A photosensitive composition, sensitive to ultraviolet light, comprising an organic solvent solution containing a leucocyanide of a triphenylmethane dye, and, as an activator for said leucocyanide, an alkyl ester of cyanuric acid in which the alkyl radicals each contain from 2 to 6 carbon atoms.

5. A photosensitive composition, sensitive to ultraviolet light, comprising a leucocyanide of a triphenylmethane dye and, as an activator therefor, triallylcyanurate.

6. A photosensitive composition, sensitive to ultraviolet light, comprising an organic solvent solution containing a leucocyanide of a triphenylmethane dye, and, as an activator for said leucocyanide, triallylcyanurate.

7. Photosensitive sheet material comprising sheet stock carrying a transparent organic film coating containing a leucocyanide of a triphenylmethane dye, and, as an activator which renders said composition sensitive to ultraviolet light, a cyanuric acid compound represented by the formula

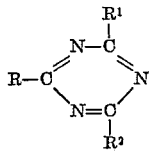

where R, R¹ and R² are selected from the group consisting of hydroxy, chlorine, and OX in which X is a hydrocarbon radical from the group consisting of alkyl, alkenyl, cycloalkyl, aryl, aralkyl, and alkaryl, X containing up to 18 carbon atoms.

8. Photosensitive sheet material comprising sheet stock carrying a leucocyanide of a triphenylmethane dye and, as an activator which renders said leucocyanide sensitive to ultraviolet light, a cyanuric acid compound represented by the formula

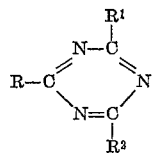

where R, R¹ and R² are the same and are selected from the group consisting of hydroxy, chlorine, and OX in which X is a hydrocarbon radical from the group consisting of alkyl, alkenyl, cycloalkyl, aryl, aralkyl, and alkaryl, X containing up to 18 carbon atoms.

9. Photosensitive sheet material comprising sheet stock carrying a leucocyanide of a triphenylmethane dye, and, as an activator which renders said leucocyanide sensitive to ultraviolet light, a triester of cyanuric acid.

10. Photosensitive sheet material comprising sheet stock carrying a leucocyanide of a triphenylmethane dye and, as an activator which renders said leucocyanide sensitive to ultraviolet light, triallylcyanurate.

11. Photosensitive sheet material comprising paper sheet stock carrying a transparent organic film-forming coating containing a leucocyanide of a triphenylmethane dye and, as an activator which renders said leucocyanide sensitive to ultraviolet light, triallylcyanurate.

References Cited in the file of this patent

UNITED STATES PATENTS

| | | |
|---|---|---|
| 2,676,887 | Chalkley | Apr. 27, 1954 |
| 2,953,560 | Baker et al. | Sept. 20, 1960 |

OTHER REFERENCES

H. Lida: "Rept. Tokyl Ind. Research Institute," 50, pages 113–16 (1955), as reported in C.A., 52 (1958), page 7705.